United States Patent [19]
Fitzgerald et al.

[11] Patent Number: 5,814,695
[45] Date of Patent: Sep. 29, 1998

[54] SILICONE MOLDING COMPOSITIONS HAVING EXTENDED USEFUL LIFE

[75] Inventors: John J. Fitzgerald, Clifton Park; Bruce C. Kuhl, Troy; Philip J. McDermott, Albany; Robert A. Smith, Clifton Park, all of N.Y.

[73] Assignee: General Electric Company, Waterford, N.Y.

[21] Appl. No.: 784,610

[22] Filed: Jan. 21, 1997

Related U.S. Application Data

[63] Continuation-in-part of Ser. No. 525,253, Sep. 8, 1995.

[51] Int. Cl.⁶ .................................................... C08K 5/24
[52] U.S. Cl. ........................ 524/731; 524/730; 524/773; 524/863; 524/303; 524/262
[58] Field of Search ................... 524/863, 730, 524/731, 773, 303, 262

[56] References Cited

U.S. PATENT DOCUMENTS

| | | |
|---|---|---|
| 3,801,430 | 4/1974 | Harper . |
| 3,856,908 | 12/1974 | Harper . |
| 3,951,839 | 4/1976 | Mino ........................................ 252/95 |
| 4,070,224 | 1/1978 | Zemlin et al. . |
| 4,092,172 | 5/1978 | Higuchi . |
| 4,167,415 | 9/1979 | Higuchi et al. . |
| 4,188,222 | 2/1980 | Nezu et al. ............................. 430/284 |
| 4,525,391 | 6/1985 | Eckberg . |
| 4,555,420 | 11/1985 | Lucas . |
| 4,563,498 | 1/1986 | Lucas . |
| 4,654,451 | 3/1987 | Miller et al. . |
| 4,709,101 | 11/1987 | Masilamani et al. . |
| 4,792,639 | 12/1988 | Masilamani et al. . |
| 4,879,339 | 11/1989 | Yoshino et al. . |
| 4,966,922 | 10/1990 | Gross et al. . |
| 5,013,772 | 5/1991 | Fujiki et al. . |
| 5,130,401 | 7/1992 | Arai et al. . |
| 5,212,017 | 5/1993 | Meder . |
| 5,232,982 | 8/1993 | Lucas . |
| 5,244,938 | 9/1993 | Arai et al. . |
| 5,258,138 | 11/1993 | Gatechair et al. . |
| 5,290,888 | 3/1994 | Gatechair et al. . |
| 5,326,816 | 7/1994 | Kinami et al. . |
| 5,420,196 | 5/1995 | Lucas . |

*Primary Examiner*—Melvyn I. Marquis
*Attorney, Agent, or Firm*—Kenneth S. Wheelock

[57] ABSTRACT

Condensation curable silicone mold making compositions containing an olefin or acetylene polymerization inhibitor have a longer useful life for making casts from curable resins comprising a polymerizable olefin relative to compositions where such a polymerization inhibitor is absent. Particularly preferred polymerization inhibitors are the esters of thiodipropionic acid and silicon polysulfides.

20 Claims, No Drawings

SILICONE MOLDING COMPOSITIONS HAVING EXTENDED USEFUL LIFE

CROSS-REFERENCE TO RELATED APPLICATIONS

This is a continuation-in-part of copending application Ser. No. 08/525,253 filed on Sep. 8, 1995.

FIELD OF THE INVENTION

The present invention relates to new room temperature vulcanizable or condensation cure silicone compositions having an extended useful life, wherein such compositions are molded into molds and used for the casting or molding of various useful articles of manufacture whereby such extended useful life is achieved by incorporating an olefin or acetylene polymerization inhibitor into the silicone composition.

BACKGROUND OF THE INVENTION

Condensation cure elastomers as well as room temperature vulcanizable silicone compositions are used in a variety of mold making applications. Such molds are used to make a variety of three dimensional objects using curable or polymerizable resinous liquids. One particularly advantageous feature of such compositions for use in molds is that complicated and undercut objects may be directly molded by pouring the silicone around the object. Because of the elastomeric nature of the cured silicone, when the molded article has sufficiently hardened the mold may be pulled away from the object and undercut mold penetrations still release because of the elastomeric nature of the mold material. Complicated objects are thus easily mass produced. Typically such objects are figurines, art deco objects and the like.

Silicone elastomeric or room temperature vulcanizable molding compositions generally are composed a di-silanol terminated polydiorganosiloxane, a reinforcing filler, a crosslinking MT, MQ, or MTQ resin, and a condensation cure catalyst. It is particularly desirable that the mixture from which the mold (negative) is to be made have a low viscosity whereby the liquid will easily flow into the detail regions of the master (positive) thus creating the mold. Upon curing, the mold should have a high tear strength, good tensile strength, and good elongation to break. Additional materials added to the basic formulation should either improve these properties or at least a minimum adverse impact.

The material to be molded is initially a liquid or resinous precursor to a glassy or solid molded final state. The usual method is to employ a polymerizable liquid such as polyester-styrene resins. These materials undergo either a partial or complete polymerization within the silicone mold thereby solidifying. This process, particularly for polymerizable resins that are olefinic in nature is exothermic. Sometimes this process is highly exothermic. After repeated use, the molds begin to fail.

There are a variety of reasons that molds fail. Parts of the elastomer or room temperature vulcanizable silicone adhere to the material being molded, i.e. the casting resin. If adhesion occurs between the mold and the molded material, when the molded material is removed from the mold, parts of the mold are transferred to the resin. This process is called chunk out.

Another type of mold failure involves the formation of a surface crust on the contact surfaces of the mold. As a consequence of this surface crust the mold loses its flexibility and begins to tear. This also results in a loss of mold integrity.

Frequently associated with this surface crust is a discoloration of the silicone material forming the mold. This is termed burn out.

Silicone elastomeric rubber molds for the casting of resinous curable or polymerizable species are variously described in U.S. Pat. Nos. 5,013,772; 4,070,224; 3,856,908; and 3,801,430.

SUMMARY OF THE INVENTION

The present invention relates to a curable silicone composition suitable for making molds enabling the mass production of molded articles wherein the curable silicone composition contains an additive that extends the useful life of the mold relative to a similar composition that does not contain the mold life-extending additive.

In a particular embodiment of the invention the present invention relates to curable silicone compositions that comprise olefin polymerization inhibitors. More particularly the present invention relates to silicone compositions that are condensation cure silicone compositions which comprise olefin or acetylene polymerization inhibitors.

Thus the present invention provides for a silicone composition for making casting molds comprising an olefin or acetylene polymerization inhibitor.

The present invention further provides for a curable silicone composition for making casting molds comprising:

(a) a di-silanol stopped linear polydimethylsiloxane having a viscosity ranging from about 10,000 to about 80,000 centipoise at 25° C.;

(b) a finely divided filler or mixtures thereof;

(c) a methyl stopped polydimethylsiloxane having a viscosity ranging from about 10 to about 350 centipoise at 25° C.;

(d) a methyl stopped polydimethylsiloxane having a viscosity ranging from about 400 to about 600 centipoise at 25° C.; and (e) an olefin polymerization inhibitor wherein said composition totals 100 parts by weight.

The present invention further provides for a curable silicone composition for making casting molds comprising:

(a) a silanol stopped hydrogen stopped polydimethylsiloxane having a viscosity ranging from about 10,000 to about 80,000 centipoise at 25° C.;

(b) a fumed silica having a surface area varying from 50 to 450 m$^2$/g;

(c) a precipitated silica wherein said precipitated silica has been treated with hexamethyldisilazane and wherein said hexamethyldisilazane treated precipitated silica has a surface area ranging from about 50 to 175 m$^2$/g;

(d) a methyl stopped polydimethylsiloxane having a viscosity ranging from about 10 to 350 centipoise at 25° C.;

(e) an olefin polymerization inhibitor; wherein said composition totals 100 parts by weight.

The present invention further provides for a condensation cure silicone composition for making casting molds comprising an olefin or acetylene polymerization inhibitor.

The present invention further provides for a silicone composition for making casting molds consisting essentially of:

(a) a curable silicone composition, and (b) an olefin or acetylene polymerization inhibitor wherein said polymerization inhibitor is selected from the group consisting of:
  2,6-di-tertiary-butyl-para-cresol,
  2-tertiary-butyl-4-methoxyphenol,
  3-tertiary-butyl-4methoxyphenol,
  alkyl substituted phenol where the alkyl group has from 1 to 30 carbon atoms,
  di-alkyl substituted phenol where each alkyl group independently has from one to 30 carbon atoms,
  tri-alkyl substituted phenol where each alkyl group independently has from one to 30 carbon atoms,
  styrylphenol,
  di-styrylphenol,
  tri-styrylphenol,
  2,2'-methylenebis(4-methyl-6-tertiary-butylphenol),
  2,2'-methylenebis(4-ethyl-6-tertiary-butylphenol),
  4,4'-methylenebis(2,6-di-tertiary-butylphenol),
  2,2'-ethylidenebis(4,6-di-tertiary-butylphenol),
  2,2'-methylenebis(4-methyl-6-(1-methylcyclohexyl)-phenol),
  4,4'-butylidenebis(6-tertiary-butyl-3-methylphenol),
  4,4'-thiobis(6-tertiary-butyl-3-methylphenol),
  4,4'-methylenebis(2,6-dimethylphenol),
  1,1'-thiobis(2-naphthol),
  2,2'-thiobis(4-methyl-6-tertiary-butylphenol),
  2,2'-isobutylidenebis(4,6-dimethylphenol),
  tetrakis(methylene 3-(3,5-di-tertary-butyl-4-hydroxyphenyl)propionate)methane,
  1,3,5-trimethyl-2,4,6-tris(3,5-di-tertiary-butyl-4-hydroxybenzyl)-benzene,
  1,3,5,-tris(3,5-di-tertiary-butyl-4-hydroxybenzyl)-s-triazine-2,4,6(1H,3H,5H)trione,
  2,4-bis(n-octylthio)-(4-hydroxy-3,5-di-tertiary-butylamino) 1,3,5-triazine,
  4-(hydroxymethyl)-2,6,-di-tertiary-butylphenol,
  2,2-diphenyl-1-picrylhydrazyl,
  esters of thiodipropionic acid having the formula:
  R'O$_2$CCH$_2$CH$_2$SCH$_2$CH$_2$CO$_2$R" where R' and R" are each independently selected from the group of monovalent hydrocarbon radicals having from one to forty carbon atoms,
  silicon polysulfides having the formula:
  S$_q$-(R'—Si(OR")$_3$)$_2$ where R' is each independently selected from the group of divalent hydrocarbon radicals having from one to forty carbon atoms and R" are each independently selected from the group of monovalent hydrocarbon radicals having from one to forty carbon atoms and q is an integer ranging from 2 to 7,
  O,O-di-normal-octadecyl(3,5-di-tertiary-butyl-4-hydroxybenzyl)phosphonate,
  1,6-hexamethylene bis(3,5-di-tertiary-butyl-4-hydroxyphenyl)propionate,
  thiodiethylene bis(3,5-di-tertiary-butyl-4-hydroxyphenyl)propionate,
  octadecyl 3-(3,5-di-tertiary-butyl-4-hydroxyphenyl)propionate,
  N,N'-hexamethylene bis(3-(3,5-di-tertiary-butyl-4-hydroxyphenyl)propionamide,
  1,3,5-tris(2-hydroxyethyl)-s-triazine-2,4,6-(1H,3H,5H)trione,
  N-(4-hydroxyphenyl)butyramide,
  N-(4-hydroxyphenyl)pelargonamide,
  N-(4-hydroxyphenyl)dodecanamide,
  N-(4-hydroxyphenyl)stearamide,
  2,6-di-tertiary-butyl-4-(dimethylaminoethyl)phenol,
  1,3,5-tris(4-tertiary-butyl-3-hydroxy-2,6-dimethylbenzyl-s-triazine-2,4,6-(1H,3H,5H)trione,
  Nickel bis(O-ethyl(3,5-di-tertiary-butyl-4hydroxybenzyl)phosphonate),
  2,2'-oxamidobisethyl 3-(3,5-di-tertiary-butyl-4-hydroxybenzyl)propionate,
  tris(2-tertiary-butyl-4(2-methyl-4-hydroxy-5-tertiary-butylphenylthio)-5-methyl)phenylphosphite,
  tetrakis (2,4-di-tertiary-butylphenyl) 4,4'-diphenylylenediphosphonite,
  normal-propyl 3,4,5-tri-hydroxybenzoate,
  calcium bis(O-ethyl(3,5-di-tertiary-butyl-4-hydroxybenzyl)phosphonate,
  Banfield's radical,
  1,3,5-triphenyl verdazyl,
  Koelsch's radical,
  1-nitroso-2-naphthol,
  2,2',6,6'-tetramethyl-1-piperidinyloxy,
  galvinoxyl,
  2,5-di-tertiaryamylhydroquinone,
  tertiary-butylhydroquinone,
  and methylhydroquinone.

Additionally the present invention also provides for a method of extending the useful life of condensation curable silicone compositions used as molds comprising:

(a) preparing a condensation curable silicone composition and (b) adding to said condensation curable silicone composition an olefin or acetylene polymerization inhibitor compound.

DETAILED DESCRIPTION OF THE INVENTION

Casting molds prepared from curable silicone formulations are made from room temperature vulcanizable or condensation curable silicone compositions. The terms room temperature vulcanizable and condensation cure are terms of art within the field of silicone chemistry. Room temperature vulcanizable silicones are those that polymerize or cure upon exposure to atmospheric water vapor. While the art names these compositions room temperature vulcanizable they can be cured at elevated temperatures when a more rapid cure rate is desired. Condensation cure silicone compositions typically are catalyzed by an organometallic condensation catalyst which is usually an organometallic tin compound, either a beta-diketonate tin compound or an alkyl tin carboxylate. The two types of formulations are not necessarily mutually exclusive.

Casting molds made from room temperature vulcanizable silicone compositions or condensation cure silicone compositions fail for a variety of reasons. One of these failure mechanisms involves the adherence of the silicone composition of the mold to the resin being shaped by the mold. When adhesion occurs and the cured cast resin is removed from the mold, parts of the mold are transferred to the cured resin. This phenomenon or process is called chunk-out.

Another failure mechanism involves the appearance of a hard crust on the surface of the mold. This hard crust interferes with the flexibility of the mold. Since flexibility is necessary to cast shapes having undercuts, this crust interferes with the use of the mold for its intended purpose.

Chemical analysis of failed molds has provided a basis for explaining mold failure. Casting resins used with silicone molds typically are mixtures of polyesters and styrene. Both components diffuse into the silicone mold. Since the cure catalyst used for the polyester styrene casting resin is dissolved in a solvent, the resin cure catalyst can also diffuse into the silicone. The cure catalyst initiates a polymerization of the polymerizable species that have diffused into the silicone mold and creates an interpenetrating polymer network of polystyrene and polyorganosiloxane which is accompanied by a hardened surface of the mold. Such a surface hardening is demonstrated by a change in the glass transition temperature of polydimethylsiloxane molds that have been contaminated with polystyrene. In this case the glass transition temperature has been raised from −120° C. to up to 70° C. This change in glass transition temperature explains the change in flexibility of the silicone mold because the modulus of the silicone has been changed.

Also, because there is an increased concentration of polystyrene at the surface of the mold there is a significant change in surface energy. The change in surface energy due to the presence of polystyrene or polystyrene polyester copolymers in the silicone polymer matrix increases the likelihood that the resin will adhere to the mold leading to chunk out.

These side reactions, occurring within the polymer matrix of the silicone mold, can be inhibited by incorporating compounds that inhibit the polymerization of olefinic species such as styrene. U.S. Pat. Nos. 5,290,888; 5,258,138; 4,792,639; 4,709,101; and 4,654,451 all deal with various aspects of the inhibition of olefin polymerization. Some of the polymerization inhibiting compounds include hindered amines, phosphites, and phenols while others include stable free radicals. Among these inhibitor compounds are:

2,6-di-tertiary-butyl-para-cresol,
2-tertiary-butyl-4-methoxyphenol,
3-tertiary-butyl-4-methoxyphenol,
alkyl substituted phenol where the alkyl group has from 1 to 30 carbon atoms,
di-alkyl substituted phenol where each alkyl group independently has from one to 30 carbon atoms,
tri-alkyl substituted phenol where each alkyl group independently has from one to 30 carbon atoms,
styrylphenol,
di-styrylphenol,
tri-styrylphenol,
2,2'-methylenebis(4-methyl-6-tertiary-butylphenol),
2,2'-methylenebis(4-ethyl-6-tertiary-butylphenol),
4,4'-methylenebis(2,6-di-tertiary-butylphenol),
2,2'-ethylidenebis(4,6-di-tertiary-butylphenol),
2,2'-methylenebis(4-methyl-6-(1-methylcyclohexyl)-phenol),
4,4'-butylidenebis(6-tertiary-butyl-3-methylphenol),
4,4'-thiobis(6-tertiary-butyl-3-methylphenol),
4,4'-methylenebis(2,6-dimethylphenol),
1,1'-thiobis(2-naphthol),
2,2'-thiobis(4-methyl-6-tertiary-butylphenol),
2,2'-isobutylidenebis(4,6-dimethylphenol),
tetrakis(methylene 3-(3,5-di-tertary-butyl-4-hydroxyphenyl)propionate)methane,
1,3,5-trimethyl-2,4,6-tris(3,5-di-tertiary-butyl-4-hydroxybenzyl)-benzene,
1,3,5,-tris(3,5-di-tertiary-butyl-4-hydroxybenzyl)-s-triazine-2,4,6(1H,3H,5H)trione,
2,4-bis(n-octylthio)-6-(4-hydroxy-3,5-di-tertiary-butylamino) 1,3,5-triazine,
4-(hydroxymethyl)-2,6,-di-tertiary-butylphenol,
2,2-diphenyl-1-picrylhydrazyl,
esters of thiodipropionic acid having the formula: R'O$_2$CCH$_2$CH$_2$SCH$_2$CH$_2$CO$_2$R'' where R' and R'' are each independently selected from the group of monovalent hydrocarbon radicals having from one to forty carbon atoms,
silicon polysulfides having the formula: S$_q$-(R'—Si(OR'')$_3$)$_2$ where R' is each independently selected from the group of divalent hydrocarbon radicals having from one to forty carbon atoms and R'' is each independently selected from the group of monovalent hydrocarbon radicals having from one to forty carbon atoms and q is an integer ranging from 2 to 7,
O,O-di-normal-octadecyl(3,5-di-tertiary-butyl-4-hydroxybenzyl)phosphonate,
1,6-hexamethylene bis(3,5-di-tertiary-butyl-4-hydroxyphenyl)propionate,
thiodiethylene bis(3,5-di-tertiary-butyl-4-hydroxyphenyl)propionate,
octadecyl 3-(3,5-di-tertiary-butyl-4-hydroxybenzyl)propionate,
N,N'-hexamethylene bis(3-(3,5-di-tertiary-butyl-4-hydroxyphenyl)propionamide,
1,3,5-tris(2-hydroxyethyl)-s-triazine-2,4,6-(1H,3H,5H)trione,
N-(4-hydroxyphenyl)butyramide,
N-(4-hydroxyphenyl)pelargonamide,
N-(4-hydroxyphenyl)dodecanamide,
N-(4-hydroxyphenyl)stearamide,
2,6-di-tertiary-butyl-4-(dimethylaminoethyl)phenol,
1,3,5-tris(4-tertiary-butyl-3-hydroxy-2,6-dimethylbenzyl-s-triazine-2,4,6-(1H,3H,5H)trione,
Nickel bis(O-ethyl(3,5-di-tertiary-butyl-4-hydroxybenzyl)phosphonate),
2,2'-oxamidobisethyl 3-(3,5-di-tertiary-butyl-4-hydroxybenzyl)propionate,
tris(2-tertiary-butyl-4(2-methyl-4-hydroxy-5-tertiary-butylphenylthio)-5-methyl)phenylphosphite,
tetrakis (2,4-di-tertiary-butylphenyl) 4,4'-diphenylylenediphosphonite,
normal-propyl 3,4,5-tri-hydroxybenzoate,
calcium bis(O-ethyl(3,5-di-tertiary-butyl-4-hydroxybenzyl)phosphonate,
Banfield's radical,
1,3,5-triphenyl verdazyl,
Koelsch's radical,
1-nitroso-2-naphthol,
2,2',6,6'-tetramethyl-1-piperidinyloxy,
galvinoxyl,
2,5-di-tertiaryamylhydroquinone,
tertiary-butylhydroquinone,
and methylhydroquinone. Applicant notes that many of the compounds listed in the foregoing list are commercially available and sold under trademarked names by their respective manufacturers.

The preferred embodiments of Applicants invention are:

I. a silicone composition for making casting molds comprising an olefin or acetylene polymerization inhibitor;

II. a curable silicone composition for making casting molds comprising:

(a) 5 to 95 parts, preferably 10 to 90 parts and most preferably 20 to 50 parts by weight of a di-silanol stopped linear polydimethylsiloxane having a viscosity ranging from about 10,000 to about 80,000 centipoise at 25° C.;

(b) 1 to 70 parts, preferably 5 to 60 parts, and most preferably 10 to 40 parts by weight of a finely divided filler or mixtures thereof;

(c) 1 to 30 parts, preferably 3 to 25 parts, and most preferably 5 to 15 parts by weight of a methyl stopped polydimethylsiloxane having a viscosity ranging from about 10 to about 350 centipoise at 25° C.;

(d) 1 to 60 parts, preferably 3 to 45 parts, and most preferably 5 to 30 parts by weight of a methyl stopped polydimethylsiloxane having a viscosity ranging from about 400 to about 600 centipoise at 25° C.; and (e) 0.00001 to 10 parts, preferably 0.0001 to 7 parts, and most preferably 0.001 to 2 parts by weight of an olefin polymerization inhibitor wherein said composition totals 100 parts by weight;

III. a curable silicone composition for making casting molds comprising:

(a) 5 to 95 parts, preferably 10 to 90 parts and most preferably 20 to 50 parts by weight of a silanol stopped hydrogen stopped polydimethylsiloxane having a viscosity ranging from about 10,000 to about 80,000 centipoise at 25° C.;

(b) 1 to 70 parts, preferably 5 to 60 parts, and most preferably 5 to 40 parts by weight of a fumed silica having a surface area varying from 50 to 450 m$^2$/g;

(c) 1 to 30 parts, preferably 1 to 25 parts, and most preferably 1 to 15 parts by weight of a precipitated silica wherein said precipitated silica has been treated with hexamethyldisilazane and wherein said hexamethyldisilazane treated precipitated silica has a surface area ranging from about 50 to 175 m$^2$/g;

(d) 1 to 70 parts, preferably 5 to 50 parts, and most preferably 10 to 30 parts by weight of a methyl stopped polydimethylsiloxane having a viscosity ranging from about 10 to 350 centipoise at 25° C.;

(e) 0.00001 to 10 parts, preferably 0.0001 to 7 parts, and most preferably 0.001 to 2 parts by weight of an olefin polymerization inhibitor; wherein said composition totals 100 parts by weight;

IV. a condensation cure silicone composition for making casting molds comprising an olefin or acetylene polymerization inhibitor;

V. a silicone composition for making casting molds consisting essentially of:

(a) a curable silicone composition, and (b) an olefin or acetylene polymerization inhibitor wherein said polymerization inhibitor is selected from the group consisting of:

2,6-di-tertiary-butyl-para-cresol (butylated hydroxy toluene or BHT), 2-tertiary-butyl-4-methoxyphenol, 3-tertiary-butyl-4-methoxyphenol, alkyl substituted phenol where the alkyl group has from 1 to 30 carbon atoms, di-alkyl substituted phenol where each alkyl group independently has from one to 30 carbon atoms, tri-alkyl substituted phenol where each alkyl group independently has from one to 30 carbon atoms, styrylphenol, di-styrylphenol, tri-styrylphenol, 2,2'-methylenebis(4-methyl-6-tertiary-butylphenol), 2,2'-methylenebis(4-ethyl-6-tertiary-butylphenol), 4,4'-methylenebis(2,6-di-tertiary-butylphenol), 2,2'-ethylidenebis(4,6-di-tertiary-butylphenol), 2,2'-methylenebis(4-methyl-6-(1-methylcyclohexyl)-phenol), 4,4'-butylidenebis(6-tertiary-butyl-3-methylphenol), 4,4'-thiobis(6-tertiary-butyl-3-methylphenol), 4,4'-methylenebis(2,6-dimethylphenol), 1,1'-thiobis(2-naphthol), 2,2'-thiobis(4-methyl-6-tertiary-butylphenol), 2,2'-isobutylidenebis(4,6-dimethylphenol), tetrakis(methylene 3-(3,5-di-tertary-butyl-4-hydroxyphenyl)propionate)methane, 1,3,5-trimethyl-2,4,6-tris(3,5-di-tertiary-butyl-4-hydroxybenzyl)-benzene, 1,3,5,-tris(3,5-di-tertiary-butyl-4hydroxybenzyl)-s-triazine-2,4,6(1H,3H,5H)trione, 2,4-bis(n-octylthio)-6-(4-hydroxy-3,5-di-tertiary-butylamino) 1,3,5-triazine, 4-(hydroxymethyl)-2,6,-di-tertiary-butylphenol, 2,2-diphenyl-1-picrylhydrazyl, esters of thiodipropionic acid having the formula:
R'O$_2$CCH$_2$CH$_2$SCH$_2$CH$_2$CO$_2$R" where R' and R" are each independently selected from the group of monovalent hydrocarbon radicals having from one to forty carbon atoms, silicon polysulfides having the formula:
S$_q$-(R'—Si(OR")$_3$)$_2$ where R' is each independently selected from the group of divalent hydrocarbon radicals having from one to forty carbon atoms and R" is each independently selected from the group of monovalent hydrocarbon radicals having from one to forty carbon atoms and q is an integer ranging from 2 to 7, O,O-di-normal-octadecyl(3,5-di-tertiary-butyl-4hydroxybenzyl)phosphonate, 1,6-hexamethylene bis(3,5-di-tertiary-butyl-4-hydroxyphenyl)propionate, thiodiethylene bis(3,5-di-tertiary-butyl-4-hydroxyphenyl) propionate, octadecyl 3-(3,5-di-tertiary-butyl-4-hydroxyphenyl) propionate, N,N'-hexamethylene bis(3-(3,5-di-tertiary-butyl-4-hydroxyphenyl)propionamide, 1,3,5-tris(2-hydroxyethyl)-s-triazine-2,4,6-(1H,3H,5H) trione, N-(4-hydroxyphenyl)butyramide, N-(4-hydroxyphenyl)pelargonamide, N-(4-hydroxyphenyl)dodecanamide, N-(4-hydroxyphenyl)stearamide, 2,6-di-tertiary-butyl-4-(dimethylaminoethyl)phenol, 1,3,5-tris(4-tertiary-butyl-3-hydroxy-2,6-dimethylbenzyl-s-triazine-2,4,6-(1H,3H,5H)trione, Nickel bis(O-ethyl(3,5-di-tertiary-butyl-4-hydroxybenzyl)phosphonate), 2,2'-oxamidobisethyl 3-(3,5-di-tertiary-butyl-4-hydroxyphenyl)propionate, tris(2-tertiary-butyl-4-(2-methyl-4-hydroxy-5-tertiary-butylphenylthio)-5-methyl)phenylphosphite, tetrakis (2,4-di-tertiary-butylphenyl) 4,4'-diphenylylenediphosphonite, normal-propyl 3,4,5-tri-hydroxybenzoate, calcium bis(O-ethyl(3,5-di-tertiary-butyl-4-hydroxybenzyl)phosphonate, Banfield's radical, 1,3,5-triphenyl verdazyl, Koelsch's radical, 1-nitroso-2-naphthol, 2,2',6,6'-tetramethyl-1-piperidinyloxy, galvinoxyl, 2,5-di-tertiaryamylhydroquinone, tertiary-butylhydroquinone, and methylhydroquinone.

The esters of thiodipropionic acid having the formula:
R'O$_2$CCH$_2$CH$_2$SCH$_2$CH$_2$CO$_2$R" where R' and R" are each independently selected from the group of monovalent hydrocarbon radicals having from one to forty carbon atoms are preferred for use in the compositions and method of the present invention. A particularly preferred ester is tridecyl thiodipropionate. It should be noted that the recited formula allows for symmetrical as well as asymmetrical esters since each R' and R" may be independently selected. Further it is to be noted that the monovalent hydrocarbon radicals R' and R" may contain halogens such as fluorine, chlorine, bromine and iodine as substituents replacing hydrogen and the carbon skeleton of such radical may be interrupted by the presence of hetero atoms such as oxygen, nitrogen, sulfur and phosphorus. Also preferred for use in this composition are silicone polysulfides having the formula:

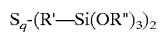

where R' is each independently selected from the group of divalent hydrocarbon radicals having from one to forty carbon atoms and R" is each independently selected from the group of monovalent hydrocarbon radicals having from one to forty carbon atoms and q is an integer ranging from 2 to 7. It should be noted that although the recited formula allows for symmetrical polysulfides, asymmetrical polysulfides are also contemplated as disclosed by this formula since each R' and R" may be independently selected. Further it is to be noted that the monovalent hydrocarbon radicals R' and R" may contain halogens such as fluorine, chlorine, bromine and iodine as substituents replacing hydrogen and the carbon skeleton of such radical may be interrupted by the presence of hetero atoms such as oxygen, nitrogen, sulfur and phosphorus. A particularly preferred polysulfide is when R" is ethyl, R' is propyl, and q is 4. Condensation curable compositions containing the silicone polysulfides of the present invention exhibit a reaction between the room temperature vulcanizable components and the silicone polysulfide. Thus,. cured compositions comprising the room temperature vulcanizable silicone compositions of the present invention and the silicone polysulfides of the present invention comprise the reaction product or reaction products of the silicone polysulfide and the room temperature vulcanizable components.

Definitions

The following compounds have been referred to in previous sections of this specification and under the condition that the name referred to in the specification is not sufficiently specific are hereby defined by Applicant by their chemical structures as follows:

Galvinoxyl:

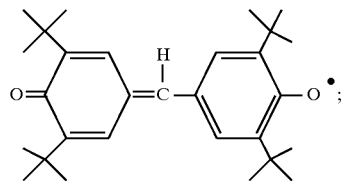

4-OH-tempo (2,2',6,6'-tetramethyl-1-piperidinyloxy);

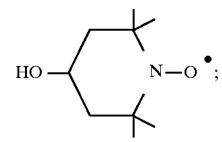

Tinuvin ®:

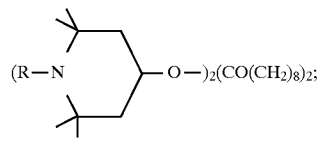

where R is hydrogen for Tinuvin 770 ®, thus R may be selected from the group consisting of hydrogen, and monovalent hydrocarbon radicals of from one to about thirty carbon atoms;

1,3,5-triphenyl verdazyl:

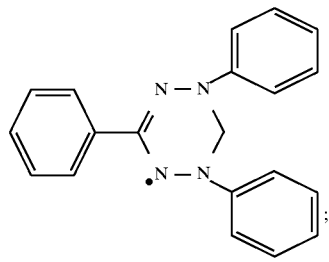

Koelsch's radical:

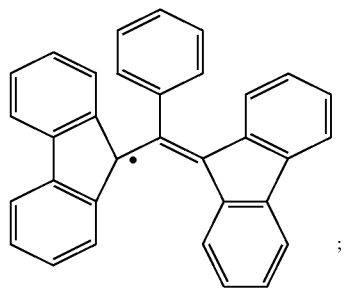

Banfield's radical:

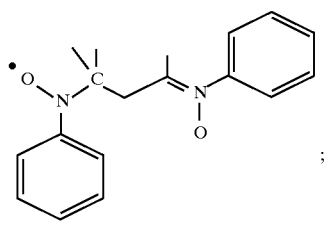

1-nitroso-2-naphthol:

2,2-diphenyl-1-picrylhydrazyl (DPPH):

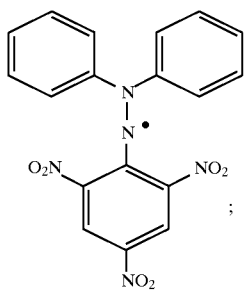

Where the phrase degree of polymerization is used in this specification the general sense of such phrase is to be intercepted as the average number of repeat units in the chemical formula of the polymer. Thus, a linear polydimethylsiloxane (PDMS), having an average degree of polymerization, x, and being a methyl stopped (M) polymer has the general formula $MD_xM$, with M being $(CH_3)_3SiO_{1/2}$, and D being $(CH_3)_2SiO_{2/2}$. Thus, in the previous general formula, the average degree of polymerization, x, being for example 100 indicates that the average value of the stoichiometric subscript, x, is 100. Applicant notes that there is a reasonable correlation between viscosity and molecular weight, particularly for linear silicone polymers.

Where the phrase condensation cure has been used in this specification or the claims appended hereto it is a term of art as defined and used in the following U.S. Pat. Nos. 5,420, 196; 5,232,982; 5,212,017; 4,966,922; 4,563,498; 4,555, 420; and 4,525,391.

It is the sense of Applicant's invention that compounds which inhibit the polymerization of olefins or acetylenes when incorporated into a curable silicone composition, particularly a silicone composition that is used to make casting molds wherein olefinic resins, acetylenic resins, or mixtures thereof are molded and polymerized therein, whereby the useful mold life of such a silicone composition when cured is extended beyond that ordinarily achievable with similar compositions absent the olefin polymerization inhibitor. Thus while Applicant has specifically enumerated several olefin and acetylenic polymerization inhibitor compounds, the scope of Applicant's invention subtends all of those compounds which inhibit the polymerization of olefins and acetylenes when they are incorporated into a curable silicone composition used for making casting molds.

All U.S. patents referenced herein are herewith and hereby specifically incorporated by reference.

EXPERIMENTAL

Four different mold making compositions were evaluated with and without the presence of olefin polymerization inhibitors.

Composition A 1) 33.42 parts by weight of di-silanol stopped linear polydimethylsiloxane having a viscosity ranging from 10,000 to 80,000 centipoise at 25° C.;

2) 12.55 parts by weight of a linear methyl stopped polydimethylsiloxane having a viscosity of 400 to 600 centipoise at 25° C.;

3) 28.63 parts by weight of finely divided quartz;

4) 1.67 parts by weight of a precipitated silica that has been treated with hexamethyldisilazane having a surface area ranging between about 130 and about 225 $m^2/g$;

5) 1.47 parts by weight of hexamethydisilazane;

6) 8.39 parts by weight of a fumed or pyrogenic silica having a surface area of ranging between about 130 and about 225 $m^2/g$;

7) 12.16 parts by weight of a methyl stopped polydimethylsiloxane having a viscosity of about 10 to 350 centipoise at 25° C.;

8) 0.30 parts by weight of a di-silanol stopped polydimethylsiloxane having a viscosity of about 10 to about 100 centipoise at 25° C.;

9) 1.41 parts by weight of water; with a total weight of about 100 parts by weight before the addition of other ingredients such as cure components, fillers, extending polymer and the like.

Composition B 1) 44.22 parts by weight of a silanol stopped hydride stopped polydimethylsiloxane having a viscosity ranging from about 10,000 to about 80,000 centipoise at 25° C.;

2) 16.36 parts by weight of a fumed silica treated with hexamethyldisilazane having a surface area of 225 $m^2/g$;

3) 1.95 parts by weight of a precipitated silica treated with hexamethyldisilazane having a surface area ranging between about of 130 and about 225 $m^2/g$;

4) 17.03 parts by weight of a methyl stopped polydimethylsiloxane having a viscosity of 10 to 350 centipoise at 25° C.;

5) 1.15 parts by weight of a di-silanol stopped polydimethylsiloxane having a viscosity of 10 to 100 centipoise at 25° C.;

6) 18.95 parts by weight of tertiary-butoxy stopped, silanol stopped polydimethylsiloxane having a viscosity ranging from about 3,000 to about 5,000 centipoise at 25° C.; and 7) 0.34 parts by weight of titanium dioxide; with a total weight of about 100 parts by weight before the addition of other ingredients such as cure components, fillers, extending polymer and the like.

Composition C (V-1065): Is a commercially available curable silicone composition for making casting molds available from Visolox Systems Inc., Poestenkill, N.Y. 12140.

Catalyst systems for the curing of the silicone composition are defined for catalyst 1 and catalyst 2 as follows:

Composition of Catalyst 1

45.14 parts by weight of vinyl stopped polydimethylsiloxane having an average degree of polymerization of 400;

37.68 parts by weight of tetra-propyl orthosilicate;

6.28 parts by weight of iso-propyl alcohol;

0.13 parts by weight water; and 10.77 parts by weight of dibutyl tin dilaurate; adding to 100.00 parts by weight.

Composition of Catalyst 2

69.28 parts by weight of methyl stopped polydimethylsiloxane having an average degree of polymerization of 50;

20.61 parts by weight of tetra-propyl-orthosilicate;

3.44 parts by weight of normal propyl alcohol;

0.07 parts by weight water; 4.61 parts by weight of dibutyl tin oxide; and 2.00 parts by weight of a mixture of 40 weight percent $Na_6Al_6Si_6O_{24}S_4$ and 60 weight percent polydimethylsiloxane vinyl containing polymer having an viscosity of 3,600 centipoise at 25+ C. degree and a vinyl content of 0.01 weight percent, adding to 100.01 parts by weight.

Hi-Pro Green ®

A commercially available catalyst formulation for curable silicone mold compositions available from Visolox Systems Inc., Poestenkill, N.Y. 12140.

To compositions A, B, and C was added varying amounts of condensation cure catalysts and various olefin polymerization inhibitors. These compositions were then used to form casting molds around a three dimensional figure. The molds so formed were used to make casts with a polyester styrene resin and the useful life of the mold evaluated after 35 and 65 casts had been made with each mold.

The following table summarizes the molds made with the various mold making compositions both with and without the olefin polymerization inhibitor present in the mold making composition and evaluates the useful life of the molds made with the various compositions.

TABLE 1

Mold Making Compositions Containing Olefin Polymerization Inhibitors

| Mold Composition weights in grams | I | II | III | IV |
|---|---|---|---|---|
| Composition | | | | |
| A | 0 | 0 | 400 | 400 |
| B | 400 | 0 | 0 | 0 |
| C | 0 | 400 | 0 | 0 |
| Catalyst | | | | |
| catalyst 1 | 40 | 0 | 0 | 0 |
| catalyst 2 | 0 | 0 | 40 | 40 |
| Hi-Pro Green ® | 0 | 40 | 0 | 0 |
| Inhibitor | | | | |
| BHT | 0 | 0 | 0 | 8 |
| Galvinoxyl | 0 | 0 | 0 | 0 |
| 4-OH-Tempo | 0 | 0 | 0 | 0 |
| Mold quality after | | | | |
| 35 pours | b/h/p | b/s | b/s | SI |
| 65 pours | b/d/pb/h | b/h | | nm |

| Mold Composition weights in grams | V | VI | VII | VIII |
|---|---|---|---|---|
| Composition | | | | |
| A | 400 | 400 | 400 | 0 |
| B | 0 | 0 | 0 | 400 |
| C | 0 | 0 | 0 | 0 |

TABLE 1-continued

Mold Making Compositions Containing Olefin Polymerization Inhibitors

| Catalyst | | | | |
|---|---|---|---|---|
| catalyst 1 | 0 | 0 | 0 | 40 |
| catalyst 2 | 40 | 40 | 40 | 0 |
| Hi-Pro Green ® | 0 | 0 | 0 | 0 |
| Inhibitor | | | | |
| BHT | 2 | 1 | 0.4 | 2 |
| Galvinoxyl | 0 | 0 | 0 | 0 |
| 4-OH-Tempo | 0 | 0 | 0 | 0 |
| Mold quality after | | | | |
| 35 pours | E | E | E | E |
| 65 pours | B | B | B | B |

| Mold Composition weights in grams | IX | X |
|---|---|---|
| Composition | | |
| A | 400 | 400 |
| B | 0 | 0 |
| C | 0 | 0 |
| Catalyst | | |
| catalyst 1 | 0 | 0 |
| catalyst 2 | 40 | 40 |
| Hi-Pro Green ® | 0 | 0 |
| Inhibitor | | |
| BHT | 0 | 0 |
| Galvinoxyl | 0.4 | 0 |
| 4-OH-Tempo | 0 | 0.4 |
| Mold quality after | | |
| 35 pours | E | E |
| 65 pours | B | B |

Notes to Table 1: b = burn out, h = hardening of mold, p = poor quality of mold, s = mold still soft, SI = inhibition at surface due to excessive amount of polymerization inhibitor, E = excellent, B = better than control and V-1065, nm = not measured.

TABLE 2

Mold Making Compositions Containing Olefin Polymerization Inhibitors

| Mold Composition weights in grams | XI | XII | XIII | XIV |
|---|---|---|---|---|
| Composition | | | | |
| A | 400 | 400 | 400 | 400 |
| B | 0 | 0 | 0 | 0 |
| C | 0 | 0 | 0 | 0 |
| Catalyst | | | | |
| catalyst 1 | 0 | 0 | 0 | 0 |
| catalyst 2 | 40 | 40 | 40 | 40 |
| Hi-Pro Green ® | 0 | 0 | 0 | 0 |
| Inhibitor | | | | |
| Tinuvin 770 ® | 0.4 | 0 | 0 | 0 |
| BHA | 0 | 0.4 | 0 | 0 |
| DPPH | 0 | 0 | 0.4 | 0 |
| BHT | 0 | 0 | 0 | 0.2 |
| Mold quality after | | | | |
| 35 pours | B | E | E | E |
| 65 pours | B | B | B | B |

TABLE 2-continued

Mold Making Compositions Containing Olefin Polymerization Inhibitors

| Mold Composition weights in grams | XI | XII | XIII | XIV |
|---|---|---|---|---|

Notes to Table 1: b = burn out, h = hardening of mold, p = poor quality of mold, s = mold still soft, SI = inhibition at surface due to excessive amount of polymerization inhibitor, E = excellent, B = better than control and V-1065, nm = not measured.

Composition D 1) 27.91 parts by weight of a disilanol stopped -linear polydimethylsiloxane having a viscosity ranging from 10,000 to 80,000 centipoise at 25° C.;

2) 32.20 parts by weight of methyl stopped polydimethylsiloxane having a viscosity ranging from 10 to 600 centipoise at 25° C.;

3) 23.80 parts by weight of finely divided quartz;

4) 1.58 parts by weight of a hexamethyldisilazane treated precipitated silica having a surface area ranging from 130 $m^2/gm$ to 225 $m^2/gm$;

5) 1.42 parts by weight hexamethyldisilazane;

6) 11.10 parts by weight of a fumed or pyrogenic silica having a surface area ranging from 130 $m^2/gm$ to 225 $m^2/gm$; 1 0 7) 0.30 parts by weight of a disilanol stopped polydimethylsiloxane having a viscosity ranging from 10 to 100 centipoise at 25° C.; and 8) 1.69 parts by weight water.

To composition D various other components may be added such as cure components, additional fillers, extending polymers and the like. A catalyst mixture was prepared containing 68.7 parts by weight of n-propylsilicate, 19.62 parts by weight of dibutyl tin dilaurate and 11.67 parts by weight of n-propanol. Varying amounts of this catalyst mixture were added to composition D as listed in Table 3. Two additional polymerization inhibitors were evaluated against composition D, di-tridecyl thiodipropionate (tridecyl thiodipropionate) and di-( (tri-ethylsiloxyl)-methyl) tetrasulfide $(S_4(CH_2Si(OC_2H_5)_3)_2$ available from DeGussa Corporation.

TABLE 3

Mold Life of Composition D with Varying Amounts of Tridecyl Thiodipropionate and $(S_4((CH_2)_3Si(OC_2H_5)_3)_2$

| Composition D, parts by weight | Catalyst Mixture, parts by weight | Inhibitor | Inhibitor Level, weight percent | Polyester[1] | Mold Life, Number of Mold Pours |
|---|---|---|---|---|---|
| 100 | 1.25 | none | 0 | 1 | 36 |
| 100 | 1.25 | TDT | 1.50 | 1 | 102 |
| 100 | 1.25 | none | 0 | 2 | 38 |
| 100 | 1.25 | TDT[2] | 0.50 | 2 | 40 |
| 100 | 1.25 | TDT | 1.00 | 2 | 57 |
| 100 | 1.25 | TDT | 3.00 | 2 | >110 |
| 100 | 1.25 | poly-sulfide[3] | 0.30 | 2 | 63 |

Notes to Table 3: [1]Polyester 1 is identified as Coro-BA-28A CoRezyn ™ supplied by Interplastic Corporation and Polyester 2 is UP Resin NPUP ™ supplied by Nan Ya Plastics Corporation of Taiwan.
[2]Di-tridecyl thiodipropionate otherwise referred to in this application as tridecyl thiodipropionate.
[3]·$(S_4((CH_2)_3Si(OC_2H_5)_3)_2$.

These results indicate that the addition of an amount of polymerization inhibitor in a range from about 0.00001 to about 10 weight percent improves the useful life of the mold by at least 25 percent, generally 50 percent and up to as much as about 100 to about 200 percent and improves the quality of the castings made with a mold containing such an inhibitor.

We claim:

1. A silicone composition for making molds comprising an olefin or acetylene polymerization inhibitor selected from the group consisting of esters of thiodipropionic acid having the formula:

$$R'O_2CCH_2CH_2SCH_2CH_2CO_2R''$$

where R' and R" are each independently selected from the group of monovalent hydrocarbon radicals having from one to forty carbon atoms and silicon polysulfides having the formula:

$$S_q\text{-}(R'\text{—}Si(OR'')_3)_2$$

where R' and R" is each independently selected from the group of monovalent hydrocarbon radicals having from one to forty carbon atoms and q is an integer ranging from 2 to 7.

2. The composition of claim 1 wherein said silicone composition is a condensation curable silicone composition.

3. A curable silicone composition for making casting molds comprising:

(a) a di-silanol stopped linear polydimethylsiloxane having a viscosity ranging from about 10,000 to about 80,000 centipoise at 25° C.;

(b) a finely divided filler or mixtures thereof;

(c) a methyl stopped polydimethylsiloxane having a viscosity ranging from about 10 to about 350 centipoise at 25° C.;

(d) a methyl stopped polydimethylsiloxane having a viscosity ranging from about 400 to about 600 centipoise at 25° C.; and (e) an olefin or acetylene polymerization inhibitor selected from the group consisting of esters of thiodipropionic acid having the formula:
$R'O_2CCH_2CH_2SCH_2CH_2CO_2R''$ where R' and R" are each independently selected from the group of monovalent hydrocarbon radicals having from one to forty carbon atoms and silicon polysulfides having the formula:
$S_q\text{-}(R'\text{—}Si(OR'')_3)_2$ where R' is each independently selected from the group of divalent hydrocarbon radicals having from one to forty carbon atoms and R" are each independently selected from the group of monovalent hydrocarbon radicals having from one to forty carbon atoms and q is an integer ranging from 2 to 7.

4. The composition of claim 3 wherein said silicone composition comprises a condensation cure catalyst.

5. A curable silicone composition for making casting molds comprising:

(a) a silanol stopped hydrogen stopped polydimethylsiloxane having a viscosity ranging from about 10,000 to about 80,000 centipoise at 25° C.;

(b) a fumed silica having a surface area varying from 50 to 450 $m^2/g$;

(c) a precipitated silica wherein said precipitated silica has been treated with hexamethyldisilazane and wherein said hexamethyldisilazane treated precipitated silica has a surface area ranging from about 50 to 175 $m^2/g$;

(d) a methyl stopped polydimethylsiloxane having a viscosity ranging from about 10 to 350 centipoise at 25° C.;

(e) an olefin or acetylene polymerization inhibitor selected from the group consisting of esters of thiodipropionic acid having the formula:

$R'O_2CCH_2CH_2SCH_2CH_2CO_2R''$ where R' and R'' are each independently selected from the group of monovalent hydrocarbon radicals having from one to forty carbon atoms and silicon polysulfides having the formula:

$S_q\text{-}(R'\text{---}Si(OR'')_3)_2$ where R' is each independently selected from the group of divalent hydrocarbon radicals having from one to forty carbon atoms and R'' are each independently selected from the group of monovalent hydrocarbon radicals having from one to forty carbon atoms and q is an integer ranging from 2 to 7.

6. The composition of claim 5 wherein said silicone composition comprises a condensation cure catalyst.

7. A condensation cure silicone composition for making molds comprising an olefin or acetylene polymerization inhibitor selected from the group consisting of esters of thiodipropionic acid having the formula:

$R'O_2CCH_2CH_2SCH_2CH_2CO_2R''$ where R' and R'' are each independently selected from the group of monovalent hydrocarbon radicals having from one to forty carbon atoms and silicon polysulfides having the formula:

$S_q\text{-}(R'\text{---}Si(OR'')_3)_2$ where R' is each independently selected from the group of divalent hydrocarbon radicals having from one to forty carbon atoms and R'' is each independently selected from the group of monovalent hydrocarbon radicals having from one to forty carbon atoms and q is an integer ranging from 2 to 7.

8. A silicone composition for making molds consisting essentially of:

(a) a curable silicone composition, and (b) an olefin or acetylene polymerization inhibitor selected from the group consisting of esters of thiodipropionic acid having the formula:

$R'O_2CCH_2CH_2SCH_2CH_2CO_2R''$ where R' and R'' are each independently selected from the group of monovalent hydrocarbon radicals having from one to forty carbon atoms and silicon polysulfides having the formula:

$S_q(R'\text{---}Si(OR'')_3)_2$ where R' is each independently selected from the group of divalent hydrocarbon radicals having from one to forty carbon atoms and R'' is each independently selected from the group of monovalent hydrocarbon radicals having from one to forty carbon atoms and q is an integer ranging from 2 to 7.

9. The composition of claim 8 wherein said curable silicone composition comprises a condensation cure catalyst.

10. The composition of claim 9 wherein said polymerization inhibitor is selected from esters of thiodipropionic acid having the formula:

$R'O_2CCH_2CH_2SCH_2CH_2CO_2R''$ where R' and R'' are each independently selected from the group of monovalent hydrocarbon radicals having from one to forty carbon atoms.

11. The composition of claim 10 wherein said ester is tridecyl thiodipropionate.

12. The composition of claim 9 wherein said olefin or polymerization inhibitor is a silicon polysulfide having the formula:

$S_q\text{-}(R'\text{---}Si(OR'')_3)_2$ where R' is each independently selected from the group of divalent hydrocarbon radicals having from one to forty carbon atoms and R'' are each independently selected from the group of monovalent hydrocarbon radicals having from one to forty carbon atoms and q is an integer ranging from 2 to 7.

13. The composition of claim 12 where R'' is ethyl, R' is propyl and q is 4.

14. A method for improving the useful life of a mold consisting essentially of a condensation curable silicone composition said method comprising:

(a) preparing a condensation curable silicone composition and (b) adding to said condensation curable silicone composition an olefin or acetylene polymerization inhibitor selected from the group consisting of esters of thiodipropionic acid having the formula:

$R'O_2CCH_2CH_2SCH_2CH_2CO_2R''$ where R' and R'' are each independently selected from the group of monovalent hydrocarbon radicals having from one to forty carbon atoms and silicon polysulfides having the formula:

$S_q\text{-}(R'\text{---}Si(OR'')_3)_2$ where R' is each independently selected from the group of divalent hydrocarbon radicals having from one to forty carbon atoms and R'' is each independently selected from the group of monovalent hydrocarbon radicals having from one to forty carbon atoms and q is an integer ranging from 2 to 7.

15. The method of claim 14 wherein said olefin or acetylene polymerization inhibitor is selected from esters of thiodipropionic acid having the formula: $R'O_2CCH_2CH_2SCH_2CH_2CO_2R''$ where R' and R'' are each independently selected from the group of monovalent hydrocarbon radicals having from one to forty carbon atoms.

16. The method of claim 15 wherein said ester is tridecyl thiodipropionate.

17. The method of claim 16 wherein said olefin or acetylene polymerization inhibitor is a silicon polysulfides having the formula:

$S_q\text{-}(R'\text{---}Si(OR'')_3)_2$ where R' and R'' is each independently selected from the group of monovalent hydrocarbon radicals having from one to forty carbon atoms and q is an integer ranging from 2 to 7.

18. The method of claim 17 wherein R'' is ethyl, R' is propyl and q is 4.

19. The cured composition of claim 12.

20. The cured composition of claim 13.

* * * * *